No. 791,629. PATENTED JUNE 6, 1905.
J. D. LEWIS.
EYEGLASSES.
APPLICATION FILED JAN. 20, 1905.

WITNESSES

INVENTOR
JOSEPH DAVIDSON LEWIS
BY Paul & Paul
HIS ATTORNEYS

No. 791,629. Patented June 6, 1905.

UNITED STATES PATENT OFFICE.

JOSEPH DAVIDSON LEWIS, OF ST. PAUL, MINNESOTA.

EYEGLASSES.

SPECIFICATION forming part of Letters Patent No. 791,629, dated June 6, 1905.

Application filed January 20, 1905. Serial No. 241,916.

*To all whom it may concern:*

Be it known that I, JOSEPH DAVIDSON LEWIS, of St. Paul, in the county of Ramsey, State of Minnesota, have invented certain new and useful Improvements in Eyeglasses, of which the following is a specification.

My invention relates to improvements in eyeglasses, and particularly to eyeglasses provided with a rigid bridge or nose-piece.

The invention consists generally in eyeglasses having a rigid bridge, lens-clamps pivotally connected thereto with means for normally holding the lenses in line with each other, and pivoted nose guards or grips provided with means for permitting said guards or grips to yield independently of any movement of the lens-clamps.

The invention consists, further, in the constructions and combinations hereinafter described, and particularly pointed out in the claims.

Figure 1:
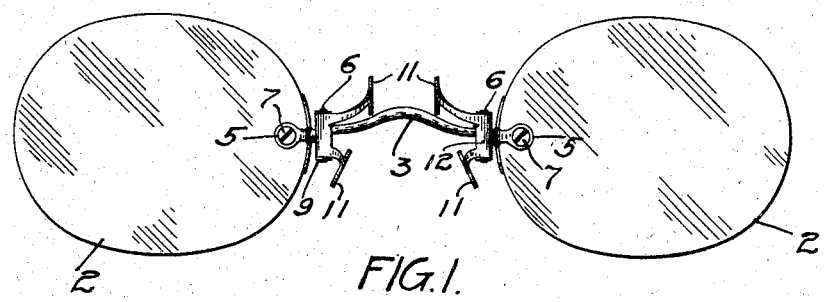
Figure 2:
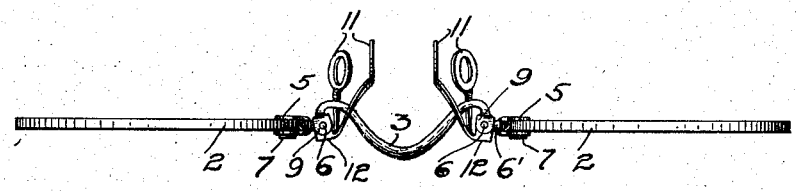
Figure 3:
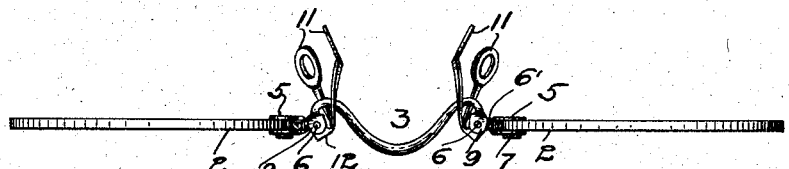
Figure 4:
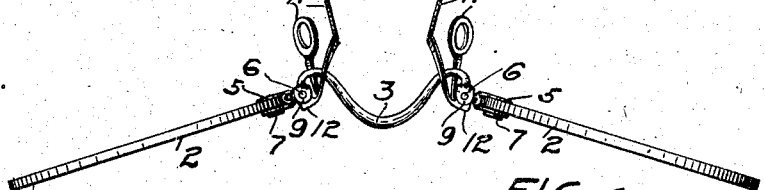
Figures 5, 6, 7, 8, 9:
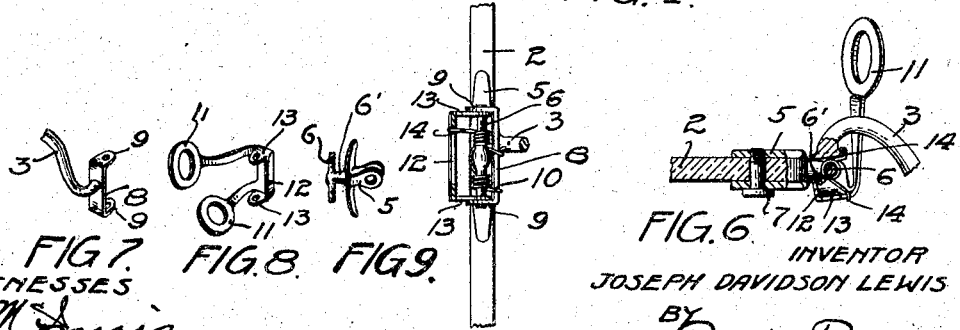

In the accompanying drawings, forming part of this specification, Figure 1 is a front elevation of a pair of eyeglasses embodying my invention. Fig. 2 is a plan view of the same. Fig. 3 is a view similar to Fig. 2, but showing the nose-grips separated to a greater extent. Fig. 4 is a view similar to Fig. 3, showing the lenses turned outward and the nose-grips also turned upon their pivots by the movement of the lenses. Fig. 5 is a transverse detail section. Fig. 6 is a horizontal detail section. Fig. 7 is a perspective view of the end of the bridge. Fig. 8 is a perspective view of one of the nose-grips. Fig. 9 is a perspective view of one of the lens-clamps.

In the drawings, 2 2 represent the lenses, which are of any suitable or preferred form of structure.

3 represents a rigid bridge. To the ends of this bridge the lens-clamps are pivotally connected. The nose guards or grips are also pivoted to the ends of the bridge, the pivots of the lens-clamps and the pivots of the nose-guards having, preferably, the same center, but said nose-guards being capable of turning on their pivots independently of the movement of the lens-clamps.

Each lens 2 has secured to it a lens-clamp 5, preferably provided with a pivot-post 6, (see Figs. 5 and 9,) connected to the clamp by the shank 6'. These clamps are secured to the lenses by any suitable means, as by the screws 7. The bridge 3 is provided at each end with a standard 8, having the ears or lugs 9, in which the pivot-post 6 is mounted. (See Fig. 5.) When the lenses are in line with each other, the shanks 6' engage the standards 8, which form stops for the lens-clamps.

A coiled spring 10 is arranged upon the pivot-post 6 below its center, one end of this spring bearing against the standard 8 and the other end against the shank 6', by which the pivot-post 6 is secured to the lens-clamp 5. (See Fig. 6.) These springs hold the lenses normally in line with each other, with the shanks of the lens-clamps against the stops or standards 8, (see Figs. 2 and 3,) while at the same time permitting the lens-clamps to be turned upon their pivots and the lenses to be turned outward. (See Fig. 4.)

The nose-guards consist, preferably, of the clips 11 11 of suitable form to grasp the sides of the nose of the wearer, each of said clips being formed integrally with or joined to a standard 12, having ears or lugs 13. This standard is pivotally united to the pivot-post 6 by the ends of said post extending through openings in the ears 13, and a spring 14 is arranged upon the pivot-post 6, one end of said spring engaging the standard 12 and the other engaging the standard 8 on the bridge, Fig. 5. It will be seen that the ends of the pivot-post pass first through the lugs or ears 13 upon the standard 12 of the nose-guard and then through the ears or lugs 9 upon the standard 8 of the bridge. By this means a pivotal connection is formed between the end of the bridge, the lens-clamp, and the nose-guard. The two parts of the nose-guard preferably extend upon opposite sides of the bridge, (see Fig. 1,) and the springs 14 tend to turn the inner ends of said nose-guards toward each other, and thereby to cause said guards to grip the opposite sides of the nose of the wearer with a yielding pressure. When it is desired to separate the nose-guards for the purpose of putting the eyeglasses in place, the lenses are turned outward, (see Fig. 4,) and in so turning the shank of the pivot-post 6 strikes the edge of the standard 12, thereby causing said nose-guards to turn with the lens-clamps and against the tension of the springs 14. This separates the inner ends of the nose-guards and permits the eyeglasses to be placed in position upon the nose of the wearer. The springs 10 bring the lenses into their normal position in line with each other, while the springs 14 press the inner ends of the nose-guards against the sides of the nose of the wearer. The nose-guards, however, readily adjust themselves to the size and shape of the nose of the wearer without interfering with the position of the lenses. In Fig. 3 I have shown the nose-guards separated, while the lenses remain in their normal position.

The advantages of this construction are many. I am able to use the rigid nose-piece, which is decidedly advantageous, and the nose-grips being pivoted independently are capable of adjustment to the nose of the wearer without moving the lenses out of line with each other. The lenses are moved outward to open the guards for adjustment to the sides of the nose, and during this movement and after the return of the lenses to their normal positions the axes of the lenses are not disturbed.

When it is desired to put the eyeglasses in position, the lenses are turned outward, turning the lens-clamps upon their pivots, and this movement also causes the nose-guards to be turned out on their pivots and to be separated a sufficient distance to permit their application to the sides of the nose of the wearer. When the lenses are released, their springs turn the lens-clamps upon their pivots until the lenses are in line with each other and in their proper position. The nose-guards, acting independently through the medium of their independent springs and pivots, adjust themselves to the nose of the wearer and press against the sides thereof with sufficient pressure to hold the eyeglasses in place and without interfering with the proper adjustment and alinement of the lenses.

It is obvious that the details of the construction may be varied in many particulars without departing from my invention.

I claim as my invention—

1. The combination, with the bridge, of the lens-clamps and the nose-guards independently pivoted to said bridge.

2. The combination, with the bridge, of the lens-clamps and the nose-guards independently pivoted to said bridge, upon common pivots, and independent springs for said clamps and guards.

3. The combination, with the bridge, of the lens-clamps and the nose-guards independently pivoted to said bridge and having common pivotal centers.

4. The combination, with the bridge, of the lens-clamps pivotally connected to said bridge, springs engaging said clamps and tending to hold the lenses in line with each other, the nose-guards independently pivoted to said bridge, and the springs engaging said nose-guards.

5. The combination, with the bridge, of the lens-clamps pivotally connected to said bridge, springs engaging said lens-clamps, the nose-guards independently pivoted to said bridge upon the same centers with said lens-clamps, and springs engaging said nose-guards whereby said nose-guards are capable of turning upon their pivots independently of the pivotal movement of the lens-clamps.

6. The combination, with the bridge provided with the standards 8 having the lugs 9, of the lens-clamps 5 provided with the pivot-posts 6 engaging said lugs, the nose-guards provided with the standards 12 and lugs 13 engaging said pivot-posts, the spring 10 upon said posts engaging the standard 8, and the spring 14 upon said posts engaging the standard 8 and the standard 12, substantially as described.

In witness whereof I have hereunto set my hand this 16th day of January, 1905.

JOSEPH DAVIDSON LEWIS.

Witnesses:
CLARA G. HANSON,
A. C. PAUL.